Patented May 16, 1950

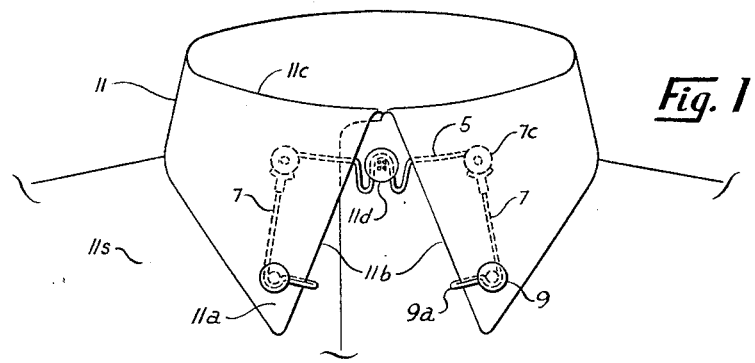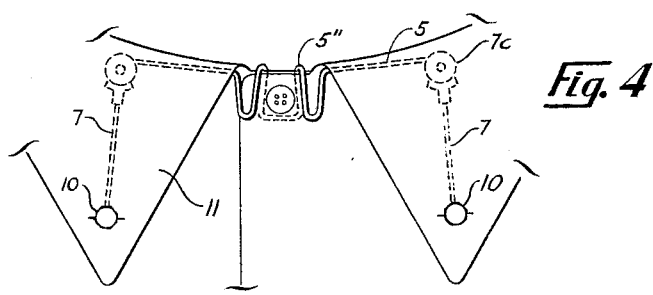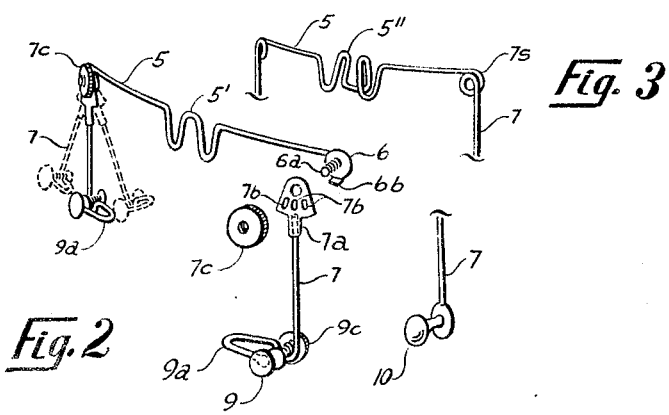

2,508,126

UNITED STATES PATENT OFFICE 2,508,126

DEVICE TO STIFFEN SHIRT COLLARS

James J. Turner, Dayton, Ohio

Application April 26, 1948, Serial No. 23,368

1 Claim. (Cl. 2—132)

This invention relates to a man's shirt collar stiffener for soft or semi-soft collars, the objects of the invention are first to furnish means for preventing the collar front from wrinkling, second to keep the collar points from curling upwards and third to provide ornamental spaced members for collars having button holes.

Other objects of the invention are to provide a device of the character above specified which is efficient and simple in operation, easily attached and removed and low in cost.

Other objects and advantages of the invention may appear from the following detailed description thereof, considered in connection with the accompanying drawing, wherein:

Figure 1 is a view illustrating the device applied to a shirt collar.

Figure 2 is a view of the device with parts partially individually shown in perspective unassembled.

Figure 3 is a view showing a modification of a portion of the invention.

Figure 4 is a view showing modified invention attached to a collar.

My invention is preferably made of spring steel wire or the like, tinned or otherwise rust proofed, and as shown in the drawing the device is formed from a single length of wire bent upon itself to form cross member 5 which has middle portion 5' looped to provide fastening means on the button of the shirt collar, the opposite ends of portion 5 being terminated by pivot attachment 6 made integral therewith. Attachment finger 6b is adapted to be inserted in an opening of 7b. Legs 7 are provided at attaching end with leg holder 7a containing a plurality of spaced openings represented by numeral 7b, the opposite end is provided with collar point ornamental retainers, the two preferred forms of point retainers are shown by clip-type 9 and collar-button type 10. Retainer 9 formed by loop 9a is slipped over the collar point edge at substantially the lower edge shown as collar point portion 11a of collar 11. Knurled screw 7c holds fast leg 7 in position when an appropriate opening has been selected from the plurality of openings in holder 7a in order to keep leg 7 in proper angle to conform to the angle of collar edge 11b of collar 11. Retainer 10 designed like a collar button is adapted for insertion in collar points provided with button holes, such a collar point is here shown Figure 4. By reason of adjustability of legs 7, to the angle of collar edge 11b, being pivoted on attachment pivot 6a of Figure 2, any reasonable length collar point can be accommodated by this device.

As shown also in Figure 2 an embodiment of the invention provides finger tightening screw 9c for further fastening collar point edge to clip-type retainer 9. Figure 3 shows a modified form of the device, contemplating the use of middle portion 5'' formed substantially like a square shaped hook adapted to be easily slipped over both collar bands of a shirt to retain the device in position in the absence of the collar button type of shirt, this is illustrated in Figure 4. This modified embodiment of the invention also contemplates the use of leg 7 being continuous with portion 5, looped upon itself so as to form shoulder joint 7s as a tensioning spring, this formation prevents the bending of legs 7 when in use, and permits a wide angle of movement of legs 7 when needed.

The terminals of legs 7 in Figure 3 contemplates the use of holding portions 9 and 10 as indicated in Figure 2. It is not thought necessary to repeat by drawings these portions.

The device is adapted to be used in the manner illustrated in Figure 1 and is inserted under the collar points with portion 5' being looped over and behind sewed on collar button 11d. Finger screws 7c are loosened sufficiently to permit leg attachment 7a to be moved to proper adjustment and for finger 6b to be inserted in a selected opening 7b, thus allowing retainer loop 9a be adjusted to collar edge 11b and fastened thereto by screw 9c tightened against collar fabric and retainer 9. Whereupon nut 7c is also tightened holding leg 7 securely in position.

When using the device on a shirt without collar buttons the modified embodiment as illustrated in Figure 4 is particularly designed to hook over collar bands of shirt 11s for support as shown.

From the foregoing it is thought that the operation and advantages of the invention will be readily understood and that the invention is also susceptible to various modifications and changes within the scope of the appended claim.

Having thus described my invention, what is claimed is:

A shirt collar support having a formed wire horizontal member, means to attach intermediate portion of said member to a shirt collar neckband at tie knot portion, pivot means attached to said member at each end thereof, downwardly extending legs removably attached to said pivot means, protruding finger means provided on said pivot means, leg attachment means containing a plurality of openings adapted to accommodate said finger means, downwardly extending legs fastened to said attachment means at one end, the opposite end terminated with collar holding means.

JAMES J. TURNER.

REFERENCES CITED

The following references are of record in the file of this patent:

UNITED STATES PATENTS

| Number | Name | Date |
|---|---|---|
| 807,884 | Tucker et al. | Dec. 19, 1905 |
| 814,419 | Allsopp | Mar. 6, 1906 |
| 1,355,798 | Zhukoff | Oct. 12, 1920 |
| 1,851,197 | Louis | Mar. 29, 1932 |
| 2,431,053 | Less | Nov. 18, 1947 |